US009481427B2

(12) United States Patent
Ko et al.

(10) Patent No.: US 9,481,427 B2
(45) Date of Patent: Nov. 1, 2016

(54) BICYCLE KICKSTAND

(71) Applicant: MANDO CORPORATION, Gyeonggi-Do (KR)

(72) Inventors: Chang Bok Ko, Namyangju-si (KR); Kangho Choi, Songpa-gu (KR)

(73) Assignee: MANDO CORPORATION, Gyeonggi-Do (KR)

( * ) Notice: Subject to any disclaimer, the term of this patent is extended or adjusted under 35 U.S.C. 154(b) by 298 days.

(21) Appl. No.: 14/137,594

(22) Filed: Dec. 20, 2013

(65) Prior Publication Data

US 2015/0059521 A1     Mar. 5, 2015

(30) Foreign Application Priority Data

Aug. 27, 2013   (KR) .......................... 10-2013-0101550

(51) Int. Cl.
*B62M 3/08*     (2006.01)
*B62H 1/08*     (2006.01)

(52) U.S. Cl.
CPC .................. *B62M 3/08* (2013.01); *B62H 1/08* (2013.01); *Y10T 74/2168* (2015.01)

(58) Field of Classification Search
CPC ........... Y10T 70/5881; Y10T 74/2172; Y10T 74/2164; B62H 1/08; B62H 1/02; B62M 3/08; B62M 3/00; B62K 15/00
USPC ........................................................ 74/594.7
See application file for complete search history.

(56) References Cited

U.S. PATENT DOCUMENTS

| | | | | |
|---|---|---|---|---|
| 652,988 A | * | 7/1900 | Wells | B62M 3/08 74/594.7 |
| 700,492 A | * | 5/1902 | Henstock | B62M 3/08 74/594.7 |
| 3,422,701 A | * | 1/1969 | Boisis | B62M 3/00 74/594.7 |
| 4,343,204 A | * | 8/1982 | Hoshi | B62K 23/08 74/551.2 |
| 5,125,678 A | * | 6/1992 | Bogen | B62K 15/006 280/278 |
| 5,161,430 A | * | 11/1992 | Febey | B62M 3/02 74/594.1 |
| 7,891,271 B2 | * | 2/2011 | Grant | B62K 23/08 123/185.5 |
| 8,388,009 B1 | * | 3/2013 | Smith | B62H 1/08 280/294 |
| 9,073,598 B2 | * | 7/2015 | Chu | B62M 3/00 |

(Continued)

FOREIGN PATENT DOCUMENTS

| | | | | |
|---|---|---|---|---|
| CN | 202345814 | | 7/2012 | |
| EP | 2 803 563 A1 | * | 11/2014 | ............. B62M 3/08 |

(Continued)

OTHER PUBLICATIONS

English Abstract of JP 2-127184, Shigemori, May 1990.*

(Continued)

*Primary Examiner* — Vinh Luong
(74) *Attorney, Agent, or Firm* — Ladas & Parry, LLP

(57) ABSTRACT

A bicycle kickstand may include a crank arm to mount a pedal to a bicycle frame, which has a slot formed in a longitudinal direction thereof, a pedal coupled perpendicular to the slot of the crank arm and configured to rotate in the longitudinal direction of the crank arm, a middle arm received in the slot of the crank arm and having both end portions which are respectively connected to the crank arm and the pedal in order to allow the pedal to be inclined with respect to the crank arm, and a safety pin configured to be inserted through the slot of the crank arm and the pedal in order to support the pedal in a perpendicular state or an inclined state with respect to the crank arm.

18 Claims, 6 Drawing Sheets

(56) References Cited

U.S. PATENT DOCUMENTS

| | | | |
|---|---|---|---|
| 2003/0041689 A1* | 3/2003 | Chu | B62K 15/00 |
| | | | 74/594.1 |
| 2006/0169423 A1 | 8/2006 | Chuang | |
| 2016/0016636 A1* | 1/2016 | Thompson | B62M 6/45 |
| | | | 74/594.7 |

FOREIGN PATENT DOCUMENTS

| | | | | |
|---|---|---|---|---|
| JP | 2-127184 | * | 5/1990 | B62M 3/08 |
| JP | 2010-126152 | | 6/2010 | |
| KR | 20-2009-0001239 | | 2/2009 | |
| SU | 1669795 | | 8/1991 | |
| TW | I370072 | | 8/2012 | |

OTHER PUBLICATIONS

Office Action dated Mar. 16, 2015 for Taiwanese Patent Application No. 102147395 and its English translation by Google Translate.
Office Action dated May 30, 2014 for corresponding European Patent Application No. 13197835.5.
Office Action dated Apr. 1, 2016 for Chinese Patent Application No. 201310741063.8.

* cited by examiner

BICYCLE KICKSTAND

CROSS-REFERENCE TO RELATED APPLICATION

This application claims the benefit of Korean Patent Application No. 2013-0101550, filed on Aug. 27, 2013 in the Korean Intellectual Property Office, the disclosure of which is incorporated in its entirety herein by reference.

BACKGROUND

1. Field

Embodiments of the present invention relate to a bicycle kickstand that is provided at a pedal.

2. Description of the Related Art

Recently, bicycles are being recognized as a great leisure activity and eco-friendly mode of transportation. Bicycles may be used in place of cars to avoid traffic or for short-distance traveling. Further, riding bicycles may be good exercise for health of modern people who do not have enough leisure time.

In general, a bicycle includes a frame, a pair of wheels mounted to the frame, a pair of pedals, a chain, a handlebar and a kickstand. When riding a bicycle, a rider steps on pedals, and a rider's pedaling force is transmitted to wheels through a chain and thereby the wheels rotate.

According to purpose, bicycles may be classified into road bicycles, racing bicycles, mountain bicycles, minivelo bicycles, hybrid bicycles and the like. High-end bicycles requiring high performance, such as racing bicycles, are not usually equipped with a kickstand that is used to allow a bicycle to stand in an upright position when the bicycle is not in use. The reasons for excluding kickstands from high performance bicycles include reducing the weight of bicycles and enhancing ride performance.

CITATION LIST

Patent Literature

Japanese Patent Laid-Open Publication No. 2010-126152 (published on Jun. 10, 2010)

The above patent literature discloses a bicycle kickstand which can be installed to a pedal crank of a bicycle. However, a rider must carry the kickstand separately from the bicycle and install the kickstand to the pedal crank when the bicycle is not in use.

SUMMARY

It is an aspect of the present invention to provide a bicycle kickstand which has a compact size and simple structure and is integrally provided at a bicycle.

Additional aspects of the invention will be set forth in part in the description which follows and, in part, will be obvious from the description, or may be learned by practice of the invention.

In accordance with one aspect of the present invention, a bicycle kickstand includes a crank arm to mount a pedal to a bicycle frame, the crank arm having a slot formed in a longitudinal direction thereof, a pedal coupled perpendicular to the slot of the crank arm and configured to rotate in the longitudinal direction of the crank arm, a middle arm received in the slot of the crank arm and having both end portions which are respectively connected to the crank arm and the pedal in order to allow the pedal to be inclined with respect to the crank arm, and a safety pin configured to be inserted through the slot of the crank arm and the pedal in order to support the pedal in a perpendicular state or an inclined state with respect to the crank arm.

The crank arm may be provided with a second rotation pin which is inserted through the slot of the crank arm, and the middle arm may have an arm slit through which the second rotation pin is also inserted, so that the middle arm moves relative to the crank arm by cooperation of the second rotation pin and the arm slit in order to allow the pedal to be inclined.

The slot of the crank arm may be formed with a support portion and the middle arm may be formed with a stepped portion which is supported by the support portion.

The crank arm may be formed with a chamfered edge at an end portion thereof in order to allow the pedal to rotate in a longitudinal direction of the crank arm.

If the safety pin is removed from the perpendicular state of the pedal with respect to the crank arm, the pedal may rotate with respect to the crank arm due to gravity.

The pedal may include a pedal body and a pedal rod. The pedal rod may be arranged in alignment with the crank arm so as to be received in the slot of the crank arm and the pedal body may be coupled perpendicular to the pedal rod and configured to rotate with respect to the pedal rod.

The pedal rod may be formed with a first rotation pin through-hole, a safety pin through-hole and a rod joint hole. The first rotation pin through-hole may be connected to the crank arm by a first rotation pin inserted through the slot of the crank arm. The safety pin through-hole may be connected to the crank arm by the safety pin inserted through the slot of the crank arm. The rod joint hole may be connected to the middle arm by a connection pin inserted through an arm joint hole formed at the middle arm.

The safety pin may include an elastic member, by which the safety pin is pressurized to be inserted through the slot of the crank arm.

As described above, since the bicycle kickstand of the present invention is formed in one united body with the pedal and has little difference from a typical pedal without a kickstand in appearance, the kickstand has a simple structure and superior performance without any negative influence on design of a bicycle.

In addition, by virtue of the safety pin, malfunction of the kickstand is prevented, and a rider can conveniently transform the function of the kickstand into a standing mode simply by removing the safety pin.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
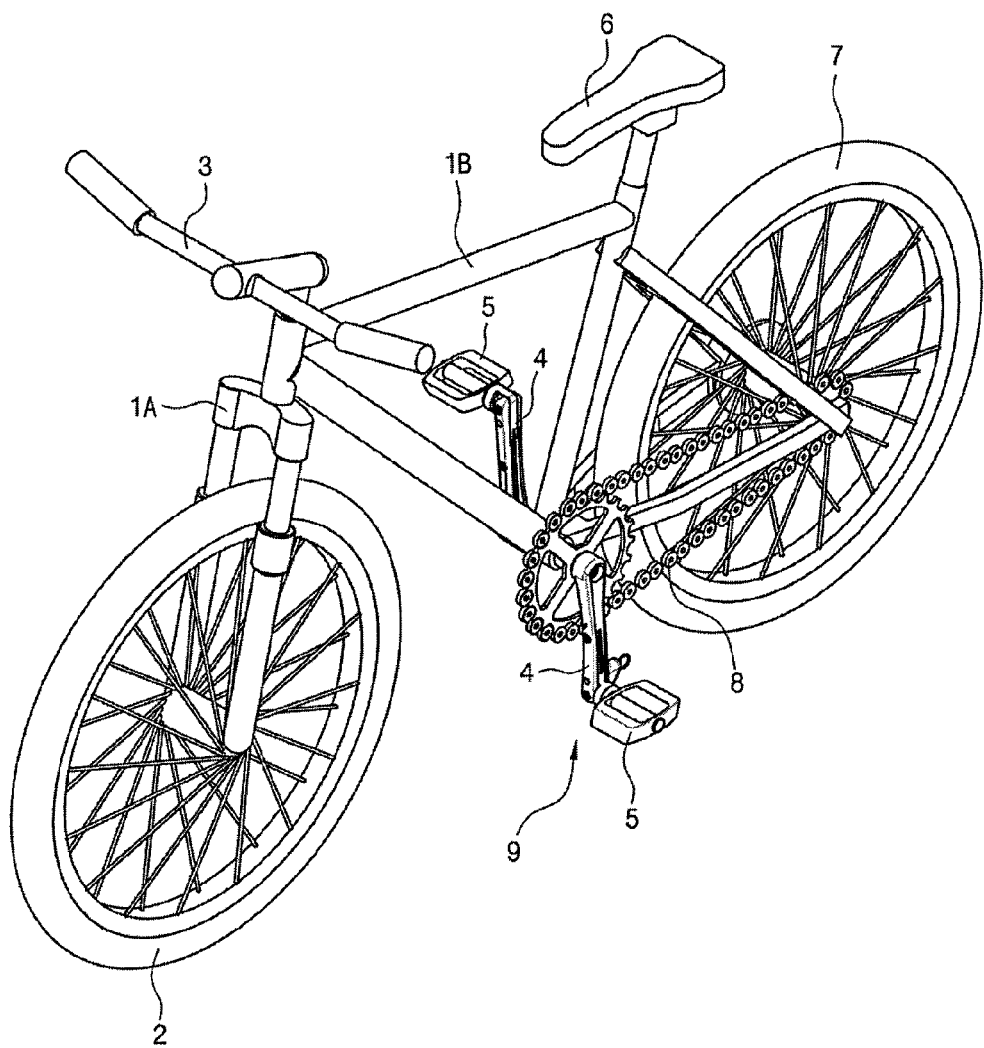
FIG. 1 is a view illustrating a bicycle equipped with a bicycle kickstand according to an embodiment of the present invention.

Now, preferred embodiments of the present invention will be described in detail with reference to the annexed drawings. The preferred embodiments described in the following specification and shown in the accompanying drawings are illustrative only and are not intended to represent all aspects of the invention, so that it is to be understood that various equivalents and modifications can be made without departing from the spirit of the invention. In the drawings, elements unrelated to the embodiments of the present invention are omitted from depiction for clarity, and the component's width, length, thickness, etc. are exaggerated for convenience. Like numbers refer to like elements throughout the description of the figures.

Figure 2:
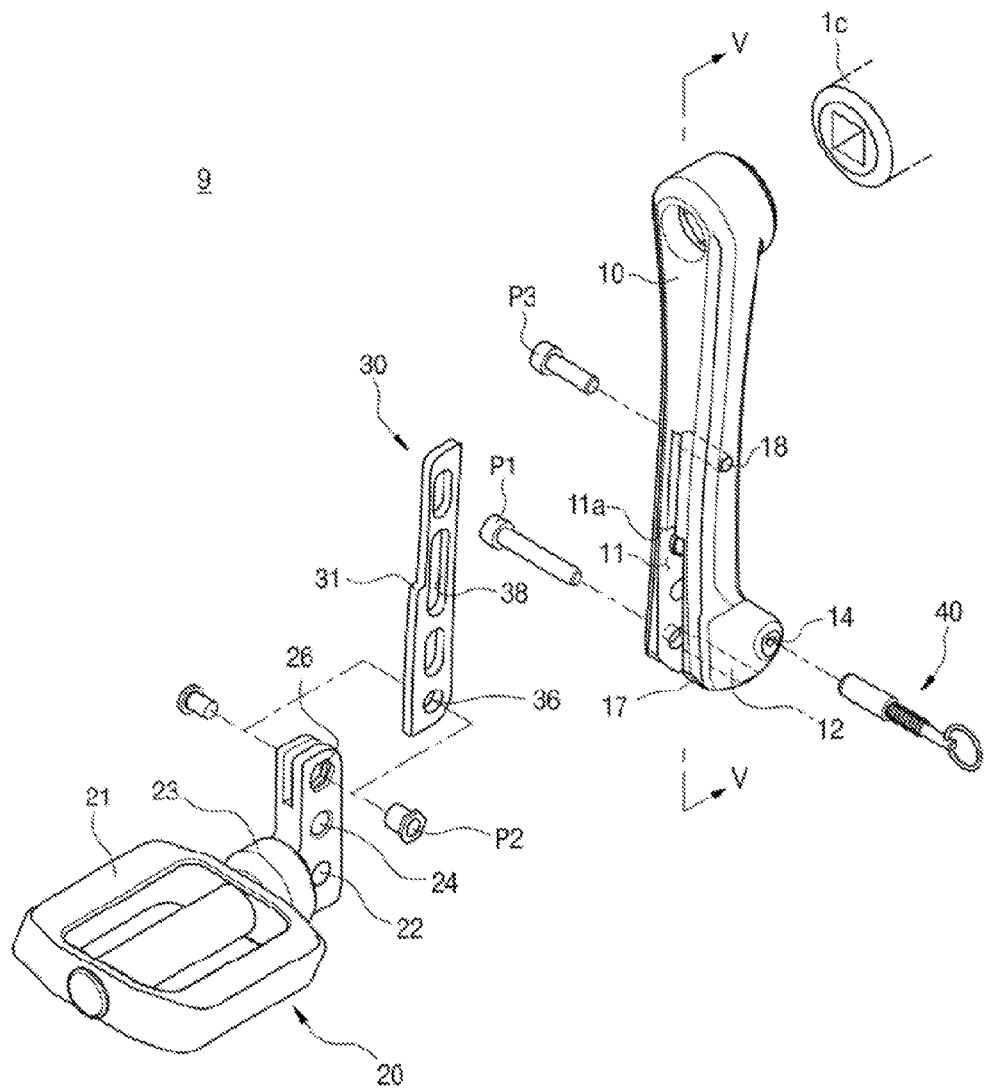
FIG. 2 is an exploded perspective view illustrating the bicycle kickstand according to an embodiment of the present invention.
Figure 3:
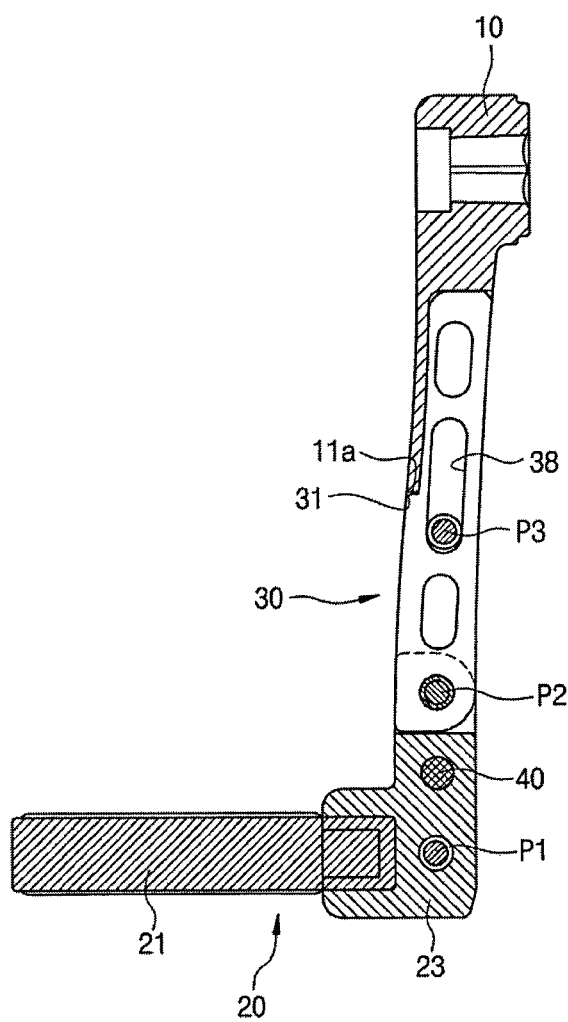
FIG. 3 is a side sectional view illustrating a pedaling mode of the bicycle kickstand according to an embodiment of the present invention.
Figure 4:
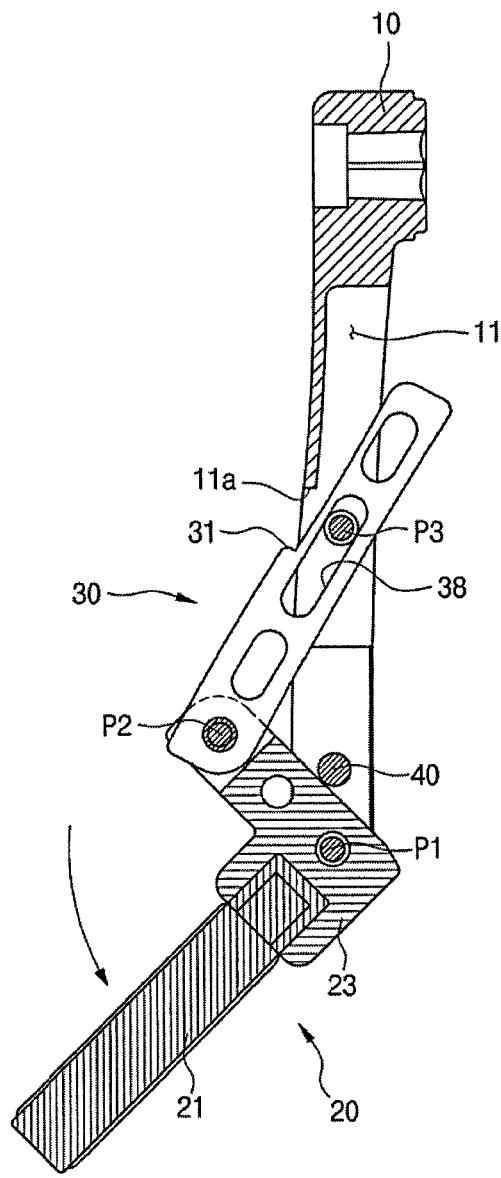
FIG. 4 is a side sectional view illustrating a standing mode of the bicycle kickstand according to an embodiment of the present invention.
Figure 5:
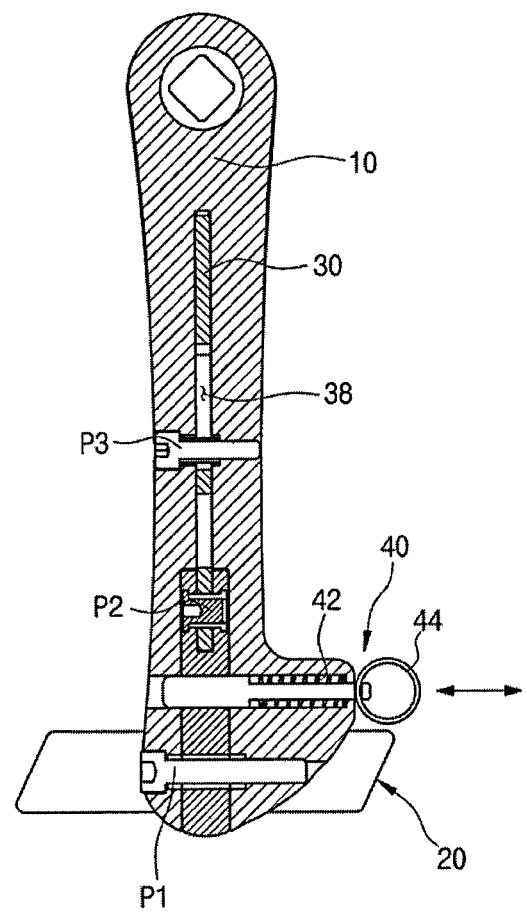
FIG. 5 is a front sectional view illustrating a standing mode of the bicycle kickstand according to an embodiment of the present invention.
Figure 6:
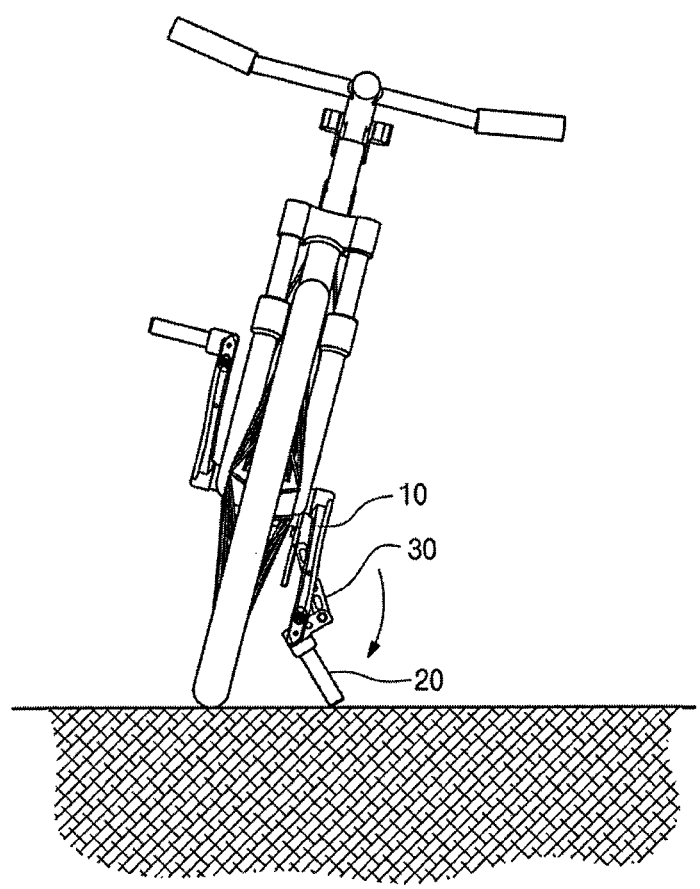
FIG. 6 is a view illustrating an operation state of the bicycle kickstand according to an embodiment of the present invention.

FIG. 1 is a view illustrating a bicycle equipped with a bicycle kickstand according to an embodiment of the present invention, FIG. 2 is an exploded perspective view of the bicycle kickstand, and FIGS. 3 through 5 are sectional views of the bicycle kickstand.

As shown in FIG. 1, a bicycle includes a handle frame 1A provided with a front wheel 2 and a handlebar 3, and a main frame 1B provided with a pair of pedals 5, a saddle 6 and a rear wheel 7. The pedals 5 and the rear wheel 7 are connected to each other by a chain 8. The handle frame 1A is rotatably coupled to the main frame 1B so that a rider can steer. The main frame 1B may have a foldable structure for high portability.

The pedals 5 to supply driving force to the bicycle are rotatably mounted to the main frame 1B using crank arms 4. A bicycle kickstand 9 is formed in one united body with one of the pedals 5 and the crank arm 4 coupled thereto.

In detail, as shown in FIG. 2, the bicycle kickstand 9 of the present invention includes a crank arm 10 formed with a slot, a pedal 20 fitted into the slot of the crank arm 10 and configured to rotate in a longitudinal direction of the crank arm 10, a middle arm 30 configured to allow the pedal 20 to be slanted with respect to the crank arm 10, and a safety pin 40 to support the pedal in a slanted state.

The crank arm 10 has a first end portion that is coupled to a pedal shaft 1c provided at the main frame 1B and a second end portion that is formed with a slot 11 which extends in a longitudinal direction and is opened toward the pedal 20. The slot area of the crank arm 10 is formed with a first rotation pin insertion-hole 12, a safety pin insertion-hole 14 and a second rotation pin insertion-hole 18, which are longitudinally arranged in order from a lower end of the slot 11.

The pedal 20 is disposed close to the slot 11 of the crank arm 10. The pedal 20 includes a pedal body 21 which a rider pedals with, and a pedal rod 23 which extends perpendicular to the pedal body 21. The pedal body 21 is rotatably coupled to the pedal rod 23. The pedal rod 23 is received in the slot 11 of the crank arm 10. The pedal rod 23 is also rotatably connected to the crank arm 10, which will be explained later. As shown in FIG. 3, when the pedal rod 23 is completely received in the slot 11 of the crank arm 10, the pedal rod 23 and the crank arm 10 are arranged in alignment with each other. When riding a bicycle in such an arrangement state, the crank arm 10 rotates about the pedal shaft 1c, and the pedal body 21 rotates about the pedal rod 23.

The pedal rod 23 is formed with a first rotation pin through-hole 22, a safety pin through-hole 24 and a rod joint hole 26. The pedal rod 23 is connected to the crank arm 10 by the following engagement: a first rotation pin P1 is inserted through the first rotation pin insertion-hole 12 formed at the lower end portion of the crank arm 10 and the first rotation pin through-hole 22 of the pedal rod 23, and the safety pin 40 is inserted through the safety pin insertion-hole 14, positioned above the first rotation pin insertion-hole 12, and the safety pin through-hole 24 of the pedal rod 23. Additionally, the pedal rod 23 is rotatably connected to the middle arm 30 in such a manner that a connection pin P2 is inserted through an arm joint hole of the middle arm 30 and the rod joint hole 26 of the pedal rod 23, which will be explained later.

The pedal rod 23 may rotate about the first rotation pin P1 in a vertical direction with respect to the crank arm 10 due to gravity. However, as long as the safety pin 40 remains inserted through the safety pin through-hole 24 of the pedal rod 23, rotation of the pedal rod 23 is prevented. The lower end of the crank arm 10 is formed with a chamfered edge 17 for smooth rotation of the pedal rod 23 when it is allowed to rotate.

The middle arm 30 serves to connect the pedal 20 to the crank arm 10 and limit the degree of rotation, i.e., the degree of inclination, of the pedal 20. In detail, as shown in FIGS. 2 through 4, the middle arm 30 is formed in a thin bar shape. The middle arm 30 is formed with a stepped portion 31 at one side portion thereof, and the slot 11 of the crank arm 10 is formed with a support portion 11a at a corresponding position to the stepped portion 31 of the middle arm 30. The stepped portion 31 of the middle arm 30 is supported by the support portion 11a of the crank arm 10, and thereby the middle arm 30 is stably received in the slot 11 of the crank arm 10. The middle arm 30 is formed with an arm joint hole 36 at one end portion thereof and an arm slit 38 at the other end portion thereof. The connection pin P2 is inserted through the rod joint hole 26 of the pedal rod 23 and the arm joint hole 36 of the middle arm 30, thereby connecting the pedal rod 23 to the middle arm 30. In addition, a second rotation pin P3 is inserted through the second rotation pin insertion-hole 18 of the crank arm 10 and the arm slit 38 of the middle arm 30, thereby connecting the middle arm 30 to the crank arm 10. When the function of the kickstand is transformed into a standing mode, the arm slit 38 of the middle arm 30 cooperates with the second rotation pin P3 and thus enables the pedal 20 to be inclined.

The safety pin 40, as shown in FIG. 5, is inserted through the safety pin insertion-hole 14 formed at lateral surfaces of the crank arm 10 and the safety pin through-hole 24 of the pedal rod 23 received in the slot 11 of the crank arm 10. In a normal riding state, the safety pin 40 is pressurized to penetrate through the slot 11 of the crank arm 10 by an elastic member 42. Due to such a locking state of the safety pin 40, the pedal 20 is maintained in a perpendicular state to the crank arm 10 so as to achieve pedaling. The locking state of the safety pin 40 is released by pulling a safety ring 44 against an elastic force of the elastic member 42.

Hereinafter, operation of the bicycle kickstand constructed as above will be described.

In a normal riding state, so as to achieve pedaling to supply driving force to the bicycle, the pedal 20 is perpendicular to the crank arm 10 (refer to FIG. 2). The riding state is securely maintained by the safety pin 40 which is inserted through the safety pin insertion-hole 14 of the crank arm 10 and the safety pin through-hole 24 of the pedal rod 23 received in the slot 11 of the crank arm 10. At this time, since the middle arm 30 is completely received in the slot 11 of the crank arm 10, the kickstand 9 of the present invention, which is formed in one united body with the pedal and the crank arm, has little difference from a typical bicycle pedal in appearance.

When the bicycle is needed to stand in an upright position, a rider steps down from the bicycle and places the pedal functioning as the kickstand near the ground. Then, the rider pulls the safety ring 44 against an elastic force of the elastic member 42 to release the locking state of the safety pin 40. Subsequently, the pedal 20 rotates downward about the first rotation pin P1 due to gravity (refer to FIG. 4). At this time, the pedal rod 23 and the middle arm 30 are exposed out of the crank arm 10 in a substantially triangular shape by virtue of the connection pin P2. Accordingly, the pedal body 21 of the pedal 20 forms an obtuse angle with the crank arm 10. While the safety pin through-hole 24 of the pedal rod 23 is displaced out of the slot 11 of the crank arm 10, if the rider releases the force of pulling the safety ring 44, the safety pin 40 is inserted back into the slot 11 of the crank arm 10 by the elastic member 42. Accordingly, the safety pin 40 supports a rear surface of the pedal rod 23. As a result, the inclined state of the pedal 20 is stably maintained.

In the drawings, it has been illustrated that a left pedal of a bicycle has a kickstand structure. However, the kickstand structure may be formed at a right pedal or both pedals. In addition, because a length of the crank arm is typically standardized, an inclination angle of the pedal rod may be adequately adjusted simply by replacing the middle arm.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A bicycle kickstand comprising:
   a crank arm to mount a pedal to a bicycle frame, the crank arm having a slot formed in a longitudinal direction thereof;
   the pedal coupled perpendicular to the slot of the crank arm and configured to rotate in the longitudinal direction of the crank arm;
   a middle arm received in the slot of the crank arm and having both end portions which are respectively connected to the crank arm and the pedal in order to allow the pedal to be inclined with respect to the crank arm; and
   a safety pin configured to be inserted through the slot of the crank arm and the pedal in order to support the pedal in a perpendicular state or an inclined state with respect to the crank arm,
   wherein the crank arm is provided with a rotation pin which is inserted through the slot of the crank arm, and the middle arm has an arm slit through which the rotation pin is inserted.

2. The bicycle kickstand according to claim 1, wherein the middle arm is configured to move relative to the crank arm by cooperation of the rotation pin and the arm slit to allow the pedal to be inclined.

3. The bicycle kickstand according to claim 2, wherein the pedal includes a pedal body and a pedal rod,
   wherein the pedal rod is arranged in alignment with the crank arm so as to be received in the slot of the crank arm and the pedal body is coupled perpendicular to the pedal rod and configured to rotate with respect to the pedal rod.

4. The bicycle kickstand according to claim 1, wherein the slot of the crank arm is formed with a support portion and the middle arm is formed with a stepped portion which is supported by the support portion.

5. The bicycle kickstand according to claim 4, wherein the pedal includes a pedal body and a pedal rod,
   wherein the pedal rod is arranged in alignment with the crank arm so as to be received in the slot of the crank arm and the pedal body is coupled perpendicular to the pedal rod and configured to rotate with respect to the pedal rod.

6. The bicycle kickstand according to claim 1, wherein the crank arm is formed with a chamfered edge at an end portion thereof in order to allow the pedal to rotate in a longitudinal direction of the crank arm.

7. The bicycle kickstand according to claim 6, wherein the pedal includes a pedal body and a pedal rod,
   wherein the pedal rod is arranged in alignment with the crank arm so as to be received in the slot of the crank arm and the pedal body is coupled perpendicular to the pedal rod and configured to rotate with respect to the pedal rod.

8. The bicycle kickstand according to claim 1, wherein if the safety pin is removed from the perpendicular state of the pedal with respect to the crank arm, the pedal rotates with respect to the crank arm due to gravity.

9. The bicycle kickstand according to claim 8, wherein the pedal includes a pedal body and a pedal rod,
   wherein the pedal rod is arranged in alignment with the crank arm so as to be received in the slot of the crank arm and the pedal body is coupled perpendicular to the pedal rod and configured to rotate with respect to the pedal rod.

10. The bicycle kickstand according to claim 1, wherein the pedal includes a pedal body and a pedal rod,
    wherein the pedal rod is arranged in alignment with the crank arm so as to be received in the slot of the crank arm and the pedal body is coupled perpendicular to the pedal rod and configured to rotate with respect to the pedal rod.

11. The bicycle kickstand according to claim 10, wherein the pedal rod is formed with a rotation pin through-hole, a safety pin through-hole and a rod joint hole,
    wherein the rotation pin through-hole is connected to the crank arm by a rotation pin inserted through the slot of the crank arm,
    the safety pin through-hole is connected to the crank arm by the safety pin inserted through the slot of the crank arm, and
    the rod joint hole is connected to the middle arm by a connection pin inserted through an arm joint hole formed at the middle arm.

12. The bicycle kickstand according to claim 1, wherein the safety pin includes an elastic member, by which the safety pin is pressurized to be inserted through the slot of the crank arm.

13. A bicycle kickstand comprising:
    a crank arm to mount a pedal to a bicycle frame, the crank arm having a slot formed in a longitudinal direction thereof;
    the pedal coupled perpendicular to the slot of the crank arm and configured to rotate in the longitudinal direction of the crank arm;

a middle arm received in the slot of the crank arm and having both end portions which are respectively connected to the crank arm and the pedal in order to allow the pedal to be inclined with respect to the crank arm; and a safety pin configured to be inserted through the slot of the crank arm and the pedal in order to support the pedal in a perpendicular state or an inclined state with respect to the crank arm, wherein the pedal includes a pedal body and a pedal rod, wherein the pedal rod is arranged in alignment with the crank arm so as to be received in the slot of the crank arm and the pedal body is coupled perpendicular to the pedal rod and configured to rotate with respect to the pedal rod, wherein the pedal rod is formed with a first rotation pin through-hole, a safety pin through-hole and a rod joint hole, wherein the first rotation pin through-hole is connected to the crank arm by a first rotation pin inserted through the slot of the crank arm, the safety pin through-hole is connected to the crank arm by the safety pin inserted through the slot of the crank arm, and the rod joint hole is connected to the middle arm by a connection pin inserted through an arm joint hole formed at the middle arm.

14. The bicycle kickstand of claim 13, wherein the crank arm is provided with a second rotation pin which is inserted through the slot of the crank arm, and the middle arm has an arm slit through which the second rotation pin is inserted, so that the middle arm is configured to move relative to the crank arm by cooperation of the second rotation pin and the arm slit to allow the pedal to be inclined.

15. The bicycle kickstand of claim 13, wherein the slot of the crank arm is formed with a support portion and the middle arm is formed with a stepped portion which is supported by the support portion.

16. The bicycle kickstand of claim 13, wherein the crank arm is formed with a chamfered edge at an end portion thereof in order to allow the pedal to rotate in a longitudinal direction of the crank arm.

17. The bicycle kickstand of claim 13, wherein if the safety pin is removed from the perpendicular state of the pedal with respect to the crank arm, the pedal rotates with respect to the crank arm due to gravity.

18. The bicycle kickstand of claim 13, wherein the safety pin includes an elastic member, by which the safety pin is pressurized to be inserted through the slot of the crank arm.

* * * * *